(12) United States Patent
Oren et al.

(10) Patent No.: US 7,860,011 B2
(45) Date of Patent: *Dec. 28, 2010

(54) METHOD AND SYSTEM FOR FAULT RESILIENCE IN NETWORKS WITH AUDIO/VIDEO BRIDGING AWARE SHORTEST PATH BRIDGING

(75) Inventors: Amit Oren, Los Altos Hills, CA (US); Wael William Diab, San Francisco, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/963,087

(22) Filed: Dec. 21, 2007

(65) Prior Publication Data
US 2008/0285460 A1    Nov. 20, 2008

Related U.S. Application Data

(60) Provisional application No. 60/917,870, filed on May 14, 2007.

(51) Int. Cl.
*G01R 31/08*    (2006.01)
(52) U.S. Cl. .................................... 370/238
(58) Field of Classification Search ........................ None
See application file for complete search history.

(56) References Cited

U.S. PATENT DOCUMENTS

| | | | |
|---|---|---|---|
| 6,760,766 B1 * | 7/2004 | Sahlqvist | 709/227 |
| 7,099,277 B2 * | 8/2006 | Sahinoglu et al. | 370/238 |
| 2003/0095553 A1 * | 5/2003 | Shiomoto et al. | 370/395.52 |
| 2003/0156543 A1 * | 8/2003 | Sahinoglu et al. | 370/238 |
| 2007/0091789 A1 | 4/2007 | Thukral | |
| 2007/0206513 A1 * | 9/2007 | Cho et al. | 370/254 |
| 2007/0280102 A1 * | 12/2007 | Vasseur et al. | 370/225 |
| 2008/0159304 A1 | 7/2008 | Ozugur et al. | |
| 2008/0232243 A1 | 9/2008 | Oren | |
| 2008/0285459 A1 | 11/2008 | Diab et al. | |

* cited by examiner

*Primary Examiner*—Chi H Pham
*Assistant Examiner*—Fan Ng
(74) *Attorney, Agent, or Firm*—McAndrews, Held & Malloy, Ltd.

(57) ABSTRACT

Aspects of a method and system for fault resilience in Audio/Video Bridging (AVB) aware Shortest Path Bridging (SPB) networks are provided. In this regard, a path cost, which may be based at least on AVB compatibility, may be determined for each network path discovered between a first network node and a second network node. Additionally, a plurality of network paths may be selected based on the determined path cost, and a plurality of network connections may be established over the selected plurality of network paths. Also, a plurality of data streams may be transmitted and/or received via the established network connections, wherein at least one of data streams comprises data that is redundant to a first data stream. Furthermore, a primary data stream may be conveyed via a first network connection and one or more redundant data streams may be conveyed via a second network connection.

24 Claims, 5 Drawing Sheets

METHOD AND SYSTEM FOR FAULT RESILIENCE IN NETWORKS WITH AUDIO/VIDEO BRIDGING AWARE SHORTEST PATH BRIDGING

CROSS-REFERENCE TO RELATED APPLICATIONS/INCORPORATION BY REFERENCE

This patent application makes reference to, claims priority to and claims benefit from U.S. Provisional Patent Application Ser. No. 60/917,870 filed on May 14, 2007.

The above stated application is hereby incorporated herein by reference in its entirety.

FIELD OF THE INVENTION

Certain embodiments of the invention relate to networking. More specifically, certain embodiments of the invention relate to a method and system for fault resilience in Audio/Video Bridging aware Shortest Path Bridging (SPB) networks.

BACKGROUND OF THE INVENTION

An increasing amount of data, and in particular multimedia content, transmitted over networks has led to much research into ways to improve the quality and reliability of streaming data over bridged local area networks. Accordingly, the IEEE is in the process of standardizing a suite of protocols, and extensions thereto, collectively known as Audio Video Bridging (AVB). The individual protocols include, among others, IEEE P802.1AS—IEEE Standard for Local and Metropolitan Area Networks—Timing and Synchronization for Time-Sensitive Applications in Bridged Local Area Networks, IEEE P801.1Qat—IEEE Standard for Local and Metropolitan Area Networks: Virtual Bridged Local Area Networks—Amendment 9: Stream Reservation Protocol (SRP) and IEEE P802.1Qav: IEEE Standard for Local and Metropolitan Area Networks: Virtual Bridged Local Area Networks—Amendment 31: Forwarding and Queuing for Time-Sensitive Streams.

Applications of Audio/Video Bridging protocols include streaming compressed and/or uncompressed Audio and/or Video between various pieces of equipment. An exemplary transmission may comprise streaming uncompressed audio from an Audio/Video receiver to multiple Networked Speakers over an Ethernet network. In this regard, it may be necessary that the rendering of Audio in all speakers is synchronized so as not to affect the listener's experience. In this manner, the audio video bridging protocols are likely to be deployed in situations where quality of service is paramount to the user experience.

Another protocol utilized extensively in today's communication network is Shortest Path Bridging (SPB). In this regard, SPB may be utilized to establish paths across a network while eliminating redundant paths or loops. In this regard, redundant paths may cause routing tables to fail since one address may be seen at multiple ports. Additionally, redundant paths may result in broadcast storms, where packets are forwarded in an endless loop, consuming processing resources and bandwidth.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for fault resilience in Audio/Video Bridging (AVB) aware Shortest Path Bridging (SPB) networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for fault resilience in Audio/Video Bridging (AVB) aware Shortest Path Bridging (SPB) networks. In this regard, a path cost, which may be based at least on AVB compatibility, may be determined for each network path discovered between a first network node and a second network node. Additionally, a plurality of network paths may be selected based on the determined path cost, and a plurality of network connections may be established over the selected plurality of network paths. Also, a plurality of data streams may be transmitted and/or received via the established network connections, wherein at least one of data streams comprises data that is redundant to a first data stream. Furthermore, a primary data stream may be conveyed via a first network connection and one or more redundant data streams may be conveyed via a second network connection. A network connection that is to be utilized to convey a primary data stream may be selected based on said determined path cost. A routing table may be generated for the discovered network paths and may comprise the determined path costs and AVB compatibility. Upon failure of one or more of said chosen network paths an alternate network path may be selected from the routing table for establishing a new network connection. Aspects of the invention may enable assigning a first stream identifier to a first of a plurality of data streams, and assigning an additional unique stream identifier to each of the at least a second of the plurality of data streams that comprises data that is redundant to the first of said plurality of data streams, wherein each of said additional unique stream identifiers differs from said first stream identifier. The plurality of data streams may be buffered and/or processed based on sequencing information associated with the plurality of data streams, and/or based on determined path costs.

Figure 1:
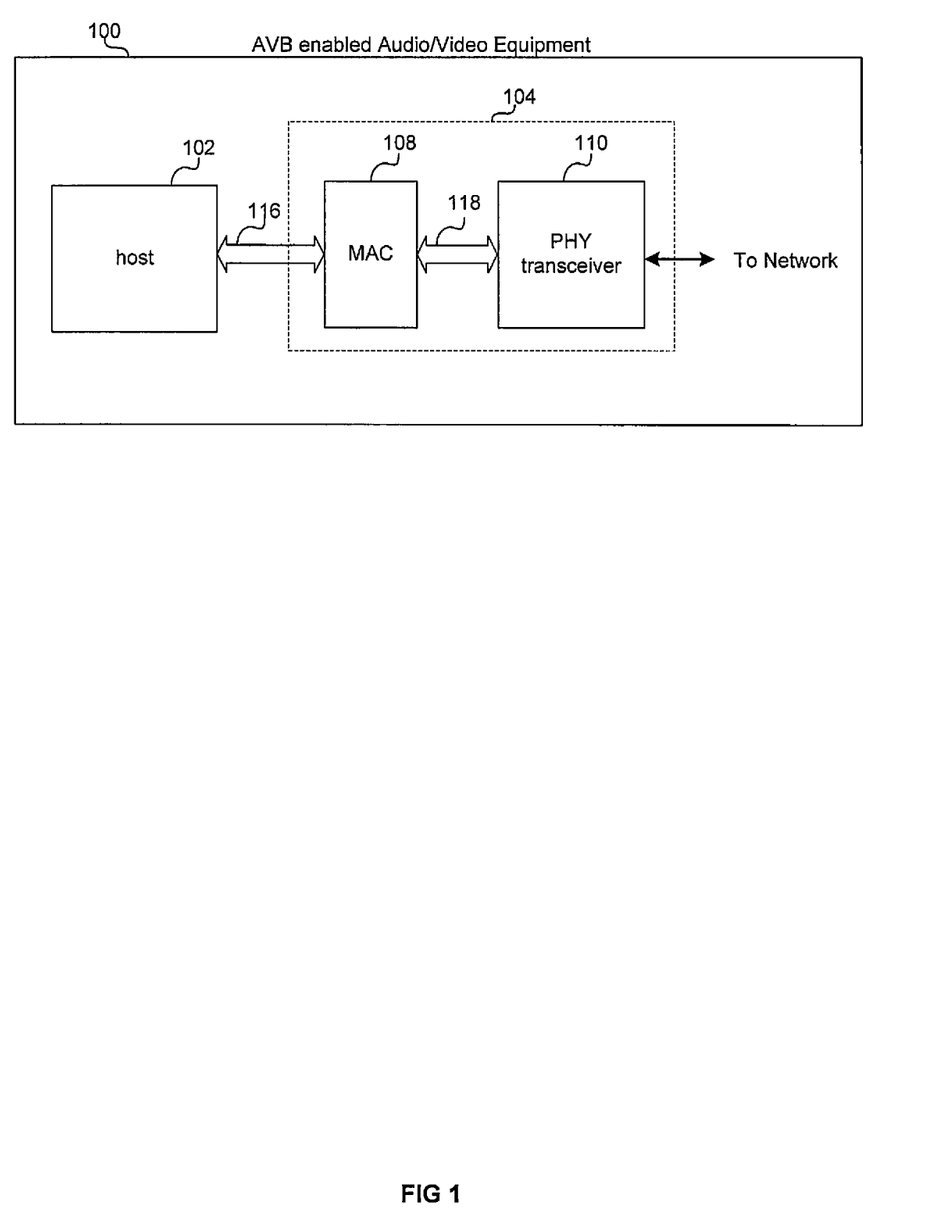
FIG. 1 is a block diagram illustrating exemplary AVB enabled Audio/Video equipment that may transmit and/or receive data over a network, in accordance with an embodiment of the invention.

FIG. 1 is a block diagram illustrating exemplary AVB enabled Audio/Video equipment that may transmit and/or receive data over a network, in accordance with an embodiment of the invention. Referring to FIG. 1, there is shown AVB enabled Audio/Video equipment 100 that comprises a host 102 and a network interface hardware (NIHW) device 104. The NIHW device 114 may further comprise a medium access control (MAC) controller 108 and a transceiver 110, to enable communication over a network. In various embodiments of the invention, the network may, for example, utilize Ethernet technology and may communicate over one or more twisted pair channels or a wireless channel. In various embodiments of the invention, the AVB enabled NV equipment 100 may comprise, for example, a microphone, an instrument, a sound board, a sound card, a video camera, a media player, a graphics card, or other audio and/or video device.

The transceiver 110 may comprise suitable logic, circuitry, and/or code that may enable communication, for example, transmission and reception of data, between the AVB enabled Audio/Video equipment 100 and a network. The transceiver 110 may support, for example, Ethernet operations. The transceiver 110 may enable multi-rate communications, such as 10 Mbps, 100 Mbps, 1000 Mbps (or 1 Gbps), 2.5 Gbps, 5 Gbps, 10 Gbps, 40 Gbps, and/or 100 Gbps, for example. In this regard, the transceiver 110 may support standard-based data rates and/or non-standard data rates. Moreover, the transceiver 110 may support standard Ethernet link lengths or ranges of operation and/or extended ranges of operation.

The transceiver 110 may be configured to handle all the physical layer requirements, which include, but are not limited to, packetization, data transfer, and serialization/deserialization (SERDES), in instances where such an operation is required. Additionally, in order to support AVB protocols, the transceiver 110 may be enabled to generate timestamps corresponding to the transmission and/or reception of data. Data packets received by the transceiver 110a from the MAC controller 108 may include data and header information for each of the above six functional layers. The transceiver 110 may be configured to encode data packets that are to be transmitted over a network and/or to decode data packets received from a network.

The data transmitted and/or received by the transceiver 110 may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. The data transmitted may comprise frames of Ethernet media independent interface (MII) data which may be delimited by start of stream and end of stream delimiters, for example.

The host 102 may represent layer 3 and above, the MAC controller 108 may represent layer 2 and above and the transceiver 110 may represent the operability and/or functionality of layer 1 or the PHY layer. In this regard, the transceiver 110 may be referred to as a PHY device or a PHY transceiver, for example. The host 102 may comprise suitable logic, circuitry, and/or code that may enable operability and/or functionality of the five highest functional layers for data packets that are to be transmitted over a network. Since each layer in the OSI model provides a service to the immediately higher interfacing layer, the MAC controller 108 may provide the necessary services to the host 102 to ensure that packets are suitably formatted and communicated to the transceiver 110. During transmission, each layer may add its own header to the data passed on from the interfacing layer above it. During reception, a compatible device having a similar OSI stack may strip off the headers as the message passes from the lower layers up to the higher layers.

The MAC controller 108 may comprise suitable logic, circuitry, and/or code that may enable handling of data link layer, layer 2, operability and/or functionality in the AVB enabled Audio/Video equipment 100. Accordingly, the MAC controller 108 may be configured to implement Ethernet protocols, such as those based on the IEEE 802.3 standard, for example. Similarly, the MAC controller 108 may be enabled to implement AVB protocols such as IEEE 801.1Qat and IEEE 802.1Qav. Additionally, the MAC controller 108 may be enabled to communicate the AVB compatibility of the AVB enabled equipment 100. In this regard, the MAC controller may support the discovery of network paths that are AVB enabled, and may enable determining and/or assigning a path cost to each network path. In this regard, AVB compatibility may be factored into a paths cost. Accordingly, possible paths across a network may be determined, sorted according to path cost, and stored to a memory device. Additional details of discovering network topology and link costs are described with respect to FIG. 3 below.

The MAC controller 108 may communicate with the transceiver 110 via an interface 118 and with the host 106 via a bus controller interface 116. The interface 118 may correspond to an Ethernet interface that comprises protocol and/or link management control signals. The interface 118 may be a multi-rate interface and/or media independent interface (MII). The bus controller interface 116 may correspond to a PCI or PCI-X interface. Notwithstanding, the invention is not limited in this regard.

In operation, an end system may communicate across a network with a second end system. In this regard, aspects of the invention may enable determining a least cost AVB enabled path between the two end systems. In this regard, the two end systems and any intermediary nodes comprising a network may be similar to the A/VB enabled equipment 100.

In various embodiments of the invention, AVB enabled A/V equipment 100 may comprise multiple transceivers 110, MAC controllers 108, and/or ports for communicating over a network. In this manner, the AVB enabled A/V equipment 100 may be enabled to simultaneously transmit/receive multiple streams, to/from one or more networks. Moreover, the AVB enabled equipment 100 may be enabled to receive redundant data streams and intelligently select which stream to render/present. In this regard, processing of received redundant streams may be based, at least in part, on costs associated with paths over which the streams are received. Additional details of transmitting and receiving redundant streams are described with respect to FIG. 2 below.

Figure 2:
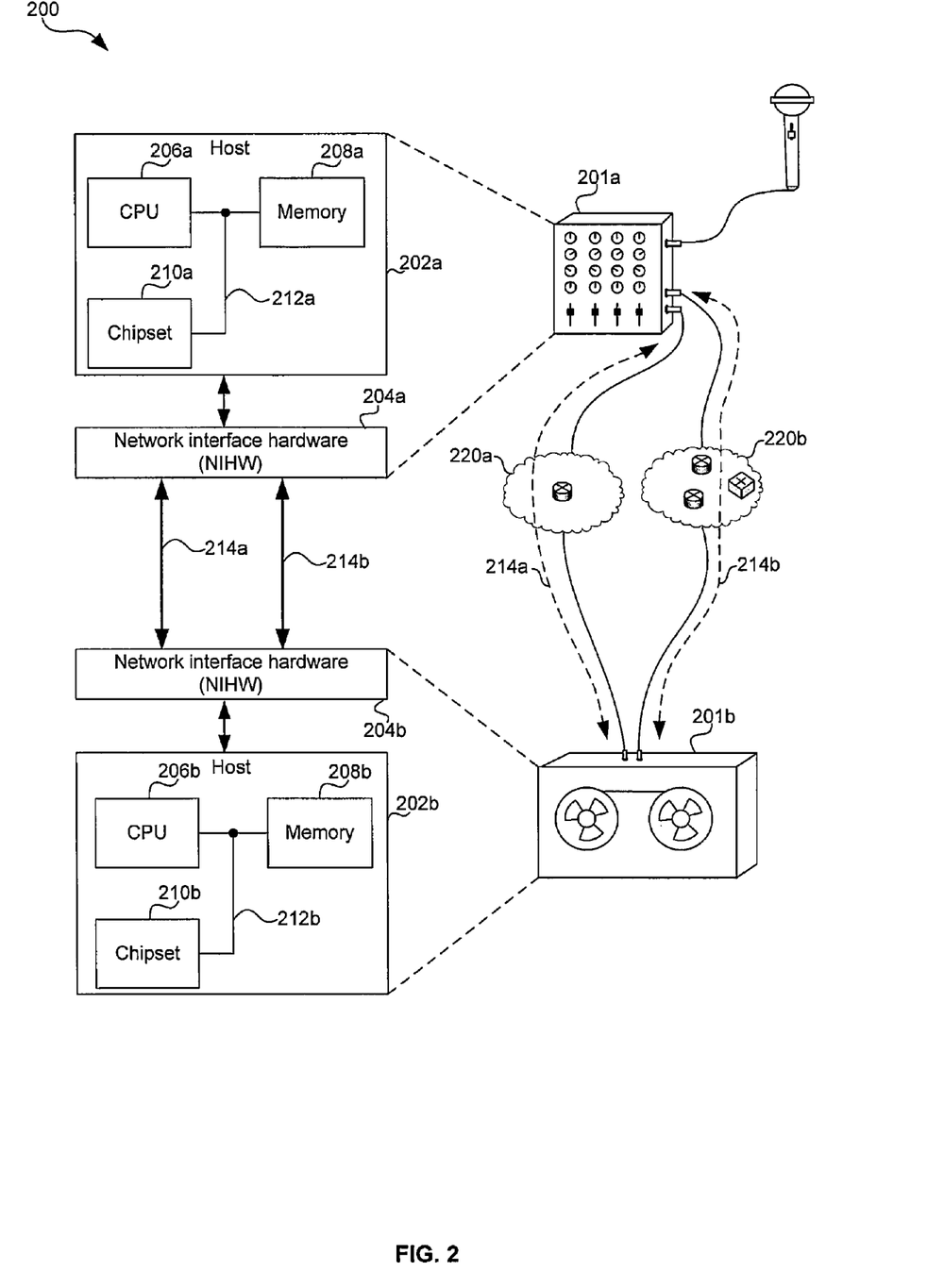
FIG. 2 is a block diagram illustrating the transmission and reception of multiple data streams, wherein one or more of the streams may comprise redundant data to and/or from AVB enabled Audio/Video equipment, in accordance with an embodiment of the invention.

FIG. 2 is a block diagram illustrating the transmission and reception of multiple data streams, wherein one or more of the streams may comprise redundant data to and/or from AVB enabled Audio/Video equipment, in accordance with an embodiment of the invention. Referring to FIG. 2, the network 200 may comprise network paths 214a and 214b and AVB enabled Audio/Video equipment 201a and 201b. In the exemplary embodiment shown, the AVB enable NV equipment may comprise a sound mixer 201a and an audio recorder 201b. Each of the AVB enabled Audio/Video equipment 201a and 201b may comprise a host 202 and a network interface hardware (NIHW) device 204. In this regard, the hosts 202a and 202b may be similar to or the same as the AVB enabled Audio/Video equipment 100 disclosed in FIG. 1. The host 202a may comprise a central processing unit (CPU) 206a, a memory 208a, and a chipset 210a. The CPU 206a, the memory 208a, and the chipset 210a may be communicatively coupled via, for example, a bus 212a. Similarly, the host 202b may comprise a central processing unit (CPU) 206b, a memory 208b, and a chipset 210b. The CPU 206b, the memory 208b, and the chipset 210b may be communicatively coupled via, for example, a bus 212b.

The hosts 202a and 202b may comprise suitable logic, circuitry, and/or code that may enable high reliability transmission and/or reception of streaming data over a network. In this regard, the host 202a and 202b may be enabled to interface with the NIHW devices 204a and 204b, respectively. In this manner, the hosts 202a and 202b may enable utilizing multiple network paths, such as the network paths 214a and 214b, to transmit and/or receive multiple data streams, wherein one or more of the streams may comprise redundant data. In this manner, the hosts 202a and 202b may enable reliable transmission, reception, and/or presentation of, for example, multimedia content in the presence of dropped/delayed packets and/or network hardware failures. Accordingly, the hosts 202a and 202b may enable the utilization and/or support of protocols such as IEEE 802.1AS to synchronize network nodes, and/or IEEE 802.1Qat to reserve resources in a network.

The CPUs 206a and 206b may comprise suitable logic, circuitry, and/or code that may enable the transmission of multiple data streams, wherein one or more of the streams may comprise redundant data, over a network. In this regard, the CPU 206a may interface with the memory 208a and/or the chipset 210a to enable transmission of multiple streams over a corresponding number of network paths. Similarly, the CPU 206b may interface with the memory 208b and/or the chipset 210b to enable transmission of multiple data streams, wherein one or more of the streams may comprise redundant data, over a corresponding number of network paths. Accordingly, the CPUs 206a and 206b may, for example, enable utilizing multiple pointers to a data buffer in order to output multiple data streams, wherein one or more of the streams may comprise redundant data. In this regard, the CPUs 206a and 206b may enable the packetization of, for example, streaming multimedia content into one or more transport streams, and may packetize the same content multiple times. Additionally, the CPUs 206a and 206b may enable assigning a unique stream identifier to each stream, and this stream ID, for example, may be placed in a header field of the transport packets. For example, the transport stream may be an MPEG transport stream and the stream ID may be carried in a "packet ID" field. Additionally, each transport packet may comprise sequencing information such as a precision clock reference, a decode timestamp, and a presentation time stamp.

The CPUs 206a and 206b may comprise suitable logic, circuitry, and/or code that may enable the reception of multiple data streams, wherein one or more of the streams may comprise redundant data. In this regard, multiple transport packets may comprise, for example, the same multimedia content. Accordingly, if a packet comprising a first stream is lost/corrupted it may be replaced with a corresponding redundant packet comprising a second stream. The CPU 206a may interface with the memory 208a and/or the chipset 210a to enable identification of multiple data streams, wherein one or more of the streams may comprise redundant data, and to enable determination of which stream's data to utilize for rendering/presentation. Similarly, the CPU 206b may interface with the memory 208b and/or the chipset 210b to enable identification of multiple data streams, wherein one or more of the streams may comprise redundant data, and to enable determination of which stream's data to utilize for rendering/presentation. In this regard, the CPUs 206a and 206b may be enabled to detect multiple data streams, wherein one or more of the streams may comprise redundant data, via the unique stream identifier assigned to each stream. Additionally, sequencing information comprising the received streams may be utilized to determine if packets have been dropped and/or corrupted from the data streams.

The memories 208a and 208b may comprise suitable logic, circuitry, and/or code that may enable storage of information regarding the networking operations and/or service applications supported by the CPU 206a and 206b and/or the chipsets 210a and 210b, respectively. Accordingly, the memories 208a and 208b may, for example, enable buffering received data and/or storing instructions that may be executed by the processor 206a and 206b and/or the chipsets 210a and 210b, respectively. Also, the memories 208a and 208b may enable buffering one or more copies of data to be transmitted. In this regard, the memories 208a and 208b may enable replicating data to support transmission of multiple data streams, wherein one or more of the streams may comprise redundant data. Additionally, the memories 208a and 208b may store a routing table or similar data structure identifying possible paths across the network 200 and path costs associated with each path.

The chipsets 210a and 210b may comprise suitable logic, circuitry, and/or code that may enable supporting of memory management, PCI master and arbitrator, graphics interface, I/O master for USB, audio, and/or peripheral devices, for example. In this regard, the chipset 210 may comprise at least one integrated circuit (IC) that provides services in support of the CPU 206 operations. In this regard, the chipset may, for example, enable encoding/decoding, compressing/decompressing, rendering, and/or presenting multimedia data. In some instances, the services provided by the chipsets 210a and 210b may be implemented in separate ICs. The choice of one or more ICs for implementing the chipsets 210a and 210b may be based on the number and/or type of services provided.

The NIHW devices 204a and 204b may comprise suitable logic, circuitry, and/or code that may enable acting as an interface between a network and the hosts 202a and 202b, respectively. In this regard, the NIHW devices 204a and 204b may enable receiving, for example, streaming multimedia content from the multiple network paths 214a and 214b and may enable communicating the data to the hosts 202a and 202b, respectively. Similarly, the NIHW devices 204a and 204b may enable receiving data from the hosts 202a and 202b, respectively, and transmitting the data onto multiple network paths, such as the paths 214a and 214b. Accordingly, the NIHW devices 204a and 204b may be similar to or the same as the NIHW device 114 disclosed in FIG. 1.

In an exemplary operation, the host 202b may request multimedia content from the host 202a. The hosts 202a and 202b may first synchronize to one another utilizing a standard such as IEEE 802.1AS. The host 202b may utilize a protocol such as IEEE 802.1Qat to reserve resources over each of the network paths 214a and 214b. In this regard, the paths 214a and 214b may each comprise one or more network links and one or more intermediate network nodes. In this regard, the network paths 214a and 214b may, respectively, traverse network clouds 220a and 220b. Accordingly, aspects of the invention may enable choosing the paths 214a and 214b based on determined costs for each available path from node 202a to node 202b. For example, the path 214a may comprise a least cost path between a first port on the NIHW 204a and a first port on the NIHW 204b, while the path 214b may comprise a least cost path between a second port on the NIHW 204a and a second port on the NIHW 204b. In an exemplary embodiment of the invention, the path cost of path 214a may be less cost than the path cost of path 214b, and thus 214a may be selected as a primary path. In various embodiments of the invention, path 214a and 214b may, for example, be separate from each other in that no network links between hosts 202a and 202b are shared. Although separate paths may provide better fault protection in the event of a failure, the paths may comprise one or more common links if completely separate paths are not possible. For example, a piece of AVB enabled A/V equipment may be capable of only connecting to a single physical link. Also, the two paths may, for example, be independent of each other in that transmission of data over path 214a is not contingent on and/or depend on the type, status, or any other characteristics of the path 214b. Although independent paths may provide better fault protection in the event of a failure, certain instances may arise where completely independent paths are not possible, for example, when a piece of AVB enabled A/V equipment comprises only a single network port. Once the SRP reservations are established, the host 202a may begin transmitting two streams, stream A and stream B, onto the two paths 214a and 214b, respectively. Accordingly, the stream A and stream B may comprise essentially the same multimedia content, but may be communicated to the host 202b over different network paths. In this regard, the streams may, for example, differ in packet headers and/or dropped/corrupted packets.

The host 202b may receive the two streams and may identify the streams, for example, utilizing the unique stream ID. Accordingly, the host 202b may enable utilizing one stream as a primary stream and the other stream as a supplemental stream. For example, the host 202b may decide to utilize the stream A as the primary stream and may only utilize content from stream B when data comprising stream A is missing or corrupted. Accordingly, if a packet is missing from stream A, the host 202b may enable replacing the lost data with the corresponding redundant data comprising stream B. In this manner, as long as the same data is not lost from both streams A and B, the host 202b may be able to fully reconstruct/render the multimedia content without any loss of quality. Similarly, if there is a failure along network path 214a, the host 202b may enable recognizing the failure and may enable utilizing stream B as the primary data stream. In this manner, a complete loss of a data stream may have little or no impact on the multimedia content presented to a user by the host 202b. In this regard, sequencing information comprising the streams may be utilized to detect lost packets and/or data.

In reconstructing/rendering the multimedia content from the two data streams, the host 202b may utilize one or more timing parameters known for the network to ensure that lost and/or otherwise compromised packets will not impact the user experience. For example, if nodes along network paths 214a and 214b adhere to a standard such as IEEE 802.1Qav, then latencies may be guaranteed for each of the paths 214a and 214b. Accordingly, a minimum buffer size in the host may be determined, for example, based on the maximum and minimum delays in the network. To explain, if stream A is primary and arrives 10 ms before stream B, then at least 10 ms of stream A may need to be buffered. In this manner, if a packet is lost from stream A, the corresponding packet will arrive on stream B before the buffer under-runs and the packet is required to be rendered/presented. Maximum and/or minimum delays may factor into or be associated with path costs and may be determined when discovering the network topology. Although only two network paths are illustrated, the invention is not limited in this regard. Accordingly, additional network paths may be utilized to provide additional resilience to network failures.

Figure 3:
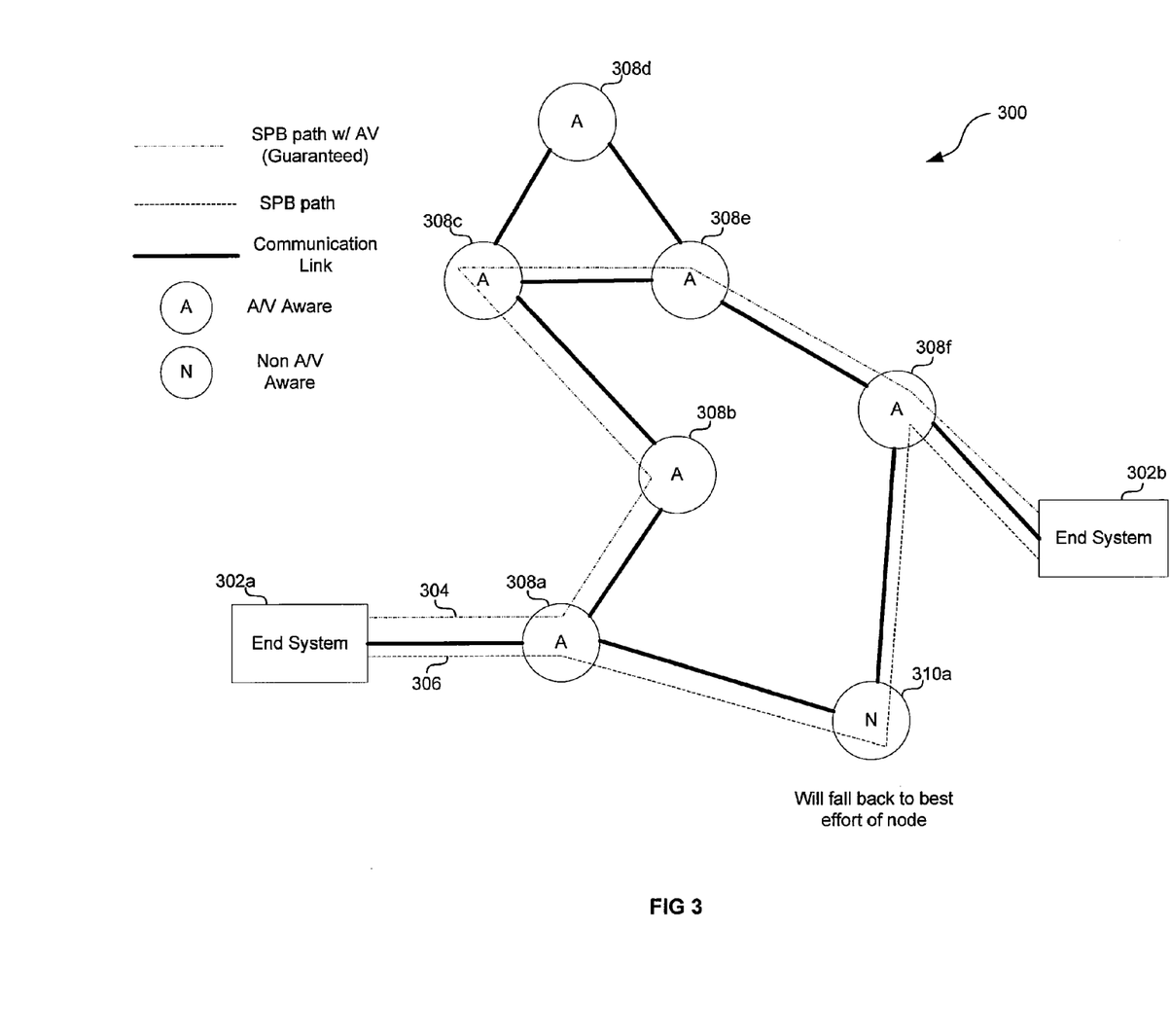
FIG. 3 is a diagram of an exemplary Shortest Path Bridging (SPB) network comprising AVB enabled and non-AVB enabled nodes, in accordance with an embodiment of the invention.

FIG. 3 is a diagram of an exemplary Shortest Path Bridging (SPB) network comprising AVB enabled and non-AVB enabled nodes, in accordance with an embodiment of the invention. Referring to FIG. 2 there is shown two end systems 302a and 302b, a plurality of AVB enabled nodes 308, and a non-AVB enabled node 310.

The end systems 302a and 302b may comprise suitable logic, circuitry, and/or code that may enable transmitting and/or receiving data over a network utilizing AVB protocols. In this regard, the end systems 302a and 302b may be similar to or the same as the AVB enabled audio/video equipment 100 and 202 described with respect to FIGS. 1 and 2, respectively.

The AVB enabled nodes 308 may comprise suitable logic, circuitry, and/or code that may enable transmitting and/or receiving data over a network utilizing AVB protocols. In this regard, the AVB enabled nodes 308 may be similar to or the same as the AVB enabled audio/video equipment 100 and 202 described with respect to FIGS. 1 and 2, respectively.

The non-AVB enabled node 310 may comprise suitable logic, circuitry, and/or code that may enable transmitting and/or receiving data over a network. In this regard, the non-AVB enabled nodes 310 may be a conventional network node, such as a bridge, switch, or router. In various instances, the non-AVB enabled node 310 may be similar to the nodes 308 but may have AVB networking disabled via, for example, software or firmware configuration.

The network path 306 may comprise the least cost path between the end systems 302a and 302b. In this regard, the path 306 may be an optimal network path for non-AVB traffic between the end systems 302a and 302b.

The network path 304 may comprise the least cost AVB enabled path between the end systems 302a and 302b. In this regard, the path 306 may be an optimal network path for AVB traffic between the end systems 302a and 302b. In an exemplary embodiment of the invention, the path 306 may be the path 214a or the path 214b of FIG. 2.

In various embodiments of the invention, AVB compatibility may be factored into link cost. For example, by assigning non-AVB links a higher link cost, aspects of the invention may enable setting a preference for AVB enabled paths.

In the network 300, each of the end systems 302 and the nodes 308 and 310, may be enabled to discover the topology of the network 300. In this regard, aspects of the invention may enable discovering possible paths between the nodes 302a and 302b. Furthermore, among the discovered paths, a least cost path between and/or a least cost AVB enabled path may be identified. To determine or learn AVB compatibility of network nodes, the AVB traffic may be monitored. In one example, the nodes 308 and the end systems 302 may identify AVB traffic and parse the source address of the traffic to identify AVB enabled nodes. In another example, SRP registration and/or reservation packets may be monitored and/or processed to identify AVB enabled nodes. Additionally, to determine or discover the topology of the network 300, Bridge Protocol Data Units (BPDU) may be exchanged by the nodes 308 and 310. In one embodiment of the invention, the BPDU's may be modified to comprise AVB compatibility information for a node. In another embodiment of the invention, BPDUs may be followed and/or preceded by other control packets which convey AVB compatibility for a node. Accordingly, one or more routing tables and/or other databases may be created and/or updated based on received AVB traffic and/or received BPDUs.

In an exemplary operation, the end system 302b may request a video stream from the end system 302a. Accordingly, network resources may be reserved over the path 304 to provide a guaranteed quality of service for the video stream. Conversely, the end system 302b may transmit general traffic, an email or web traffic for example, via the path 306. Accordingly, general traffic may experience minimal delays and/or latencies while AVB traffic may be provided guaranteed resources across a network.

Figure 4A:
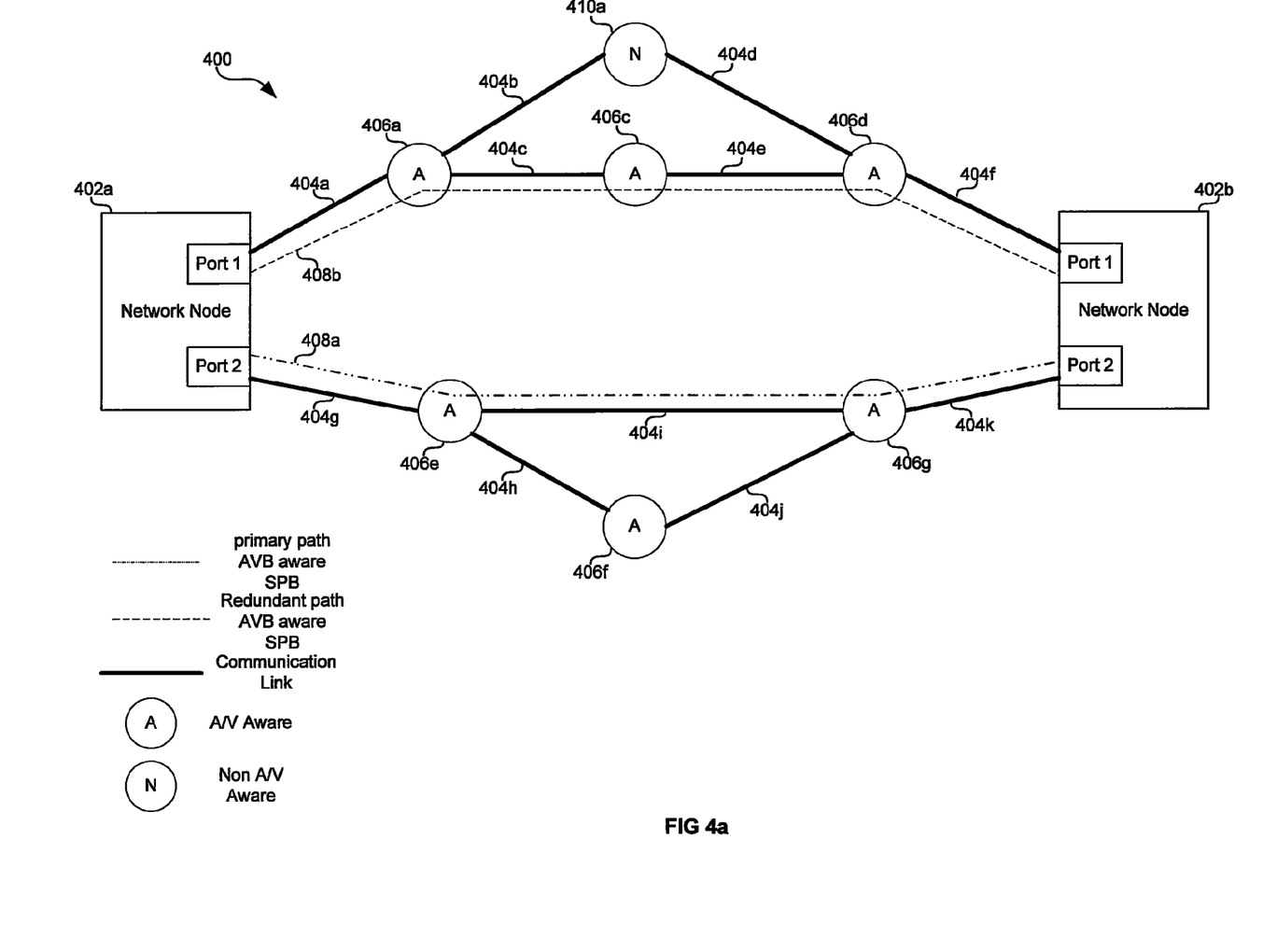
FIG. 4a is a diagram illustrating redundant paths for fault resiliency in an AVB aware Shortest Path Bridging (SPB) network, in accordance with an embodiment of the invention.

FIG. 4a is a diagram illustrating redundant paths for fault resiliency in an AVB aware Shortest Path Bridging (SPB) network, in accordance with an embodiment of the invention. Referring to FIG. 4a there is shown an exemplary network 400 over which data may be communicated between the nodes 402a and 402b. In addition to the nodes 402a and 402b, the network 400 may comprise one or more AVB enabled nodes 406, one or more non-AVB enabled nodes 410, and a plurality of links 404.

The nodes 402a and 402b may comprise suitable logic, circuitry, and/or code that may enable transmitting and/or receiving data over a network utilizing AVB protocols. In this regard, the nodes 402a and 402b may be similar to or the same as the AVB enabled audio/video equipment 100, 201, and 302 as described with respect to FIGS. 1, 2, and 3, respectively.

The AVB enabled nodes 408 may comprise suitable logic, circuitry, and/or code that may enable transmitting and/or receiving data over a network utilizing AVB protocols. In this regard, the AVB enabled nodes 308 may be similar to or the same as the AVB enabled audio/video equipment 100, 201, and 302 as described with respect to FIGS. 1, 2, and 3, respectively.

The non-AVB enabled node 410 may comprise suitable logic, circuitry, and/or code that may enable transmitting and/or receiving data over a network. In this regard, the non-AVB enabled nodes 308 may be a conventionally network node, such as a bridge, switch, or router. In various instances, the non-AVB enabled node 410 may be similar to the nodes 408 but may have AVB networking disabled via, for example, software or firmware configuration.

The links 404 may comprise, for example, unshielded twisted pair cables, coaxial cables, fiber optic cables, and/or wireless connections.

In operation, each port of the nodes 402 may determine the topology of the network 400 in order to discover a least cost path between the nodes 402a and 402b. In this regard, the topology of the network may be discovered as described above with respect to FIG. 3. Accordingly, two paths 408a and 408b between the nodes 402a and 402b may be established, and resources over those paths may be reserved for transmitting a plurality of data streams, wherein one or more of the streams redundant data, as described above with respect to FIG. 2. In this regard, the path 408a may be the least cost path between node 402a port 2 and node 402b port 2. Similarly, the path 408b may be the least cost path between node 402a port 1 and node 402b port 1.

In various aspects of the invention, once the two paths 408a and 408b have been established, the path costs of each of the two paths may be compared. Based on this comparison, one path may be selected for use as a primary path and another path may be selected for use as a redundant path. For example, the lower cost of the two paths may be chosen as the primary path, while the higher cost path of the two may be the redundant path. Additionally, the path costs determined for the paths 408a and 408b may be utilized to determine necessary resources, such as buffer sizes, for receiving redundant streams and preventing loss of data quality in the event of a failure in the network.

Figure 4B:
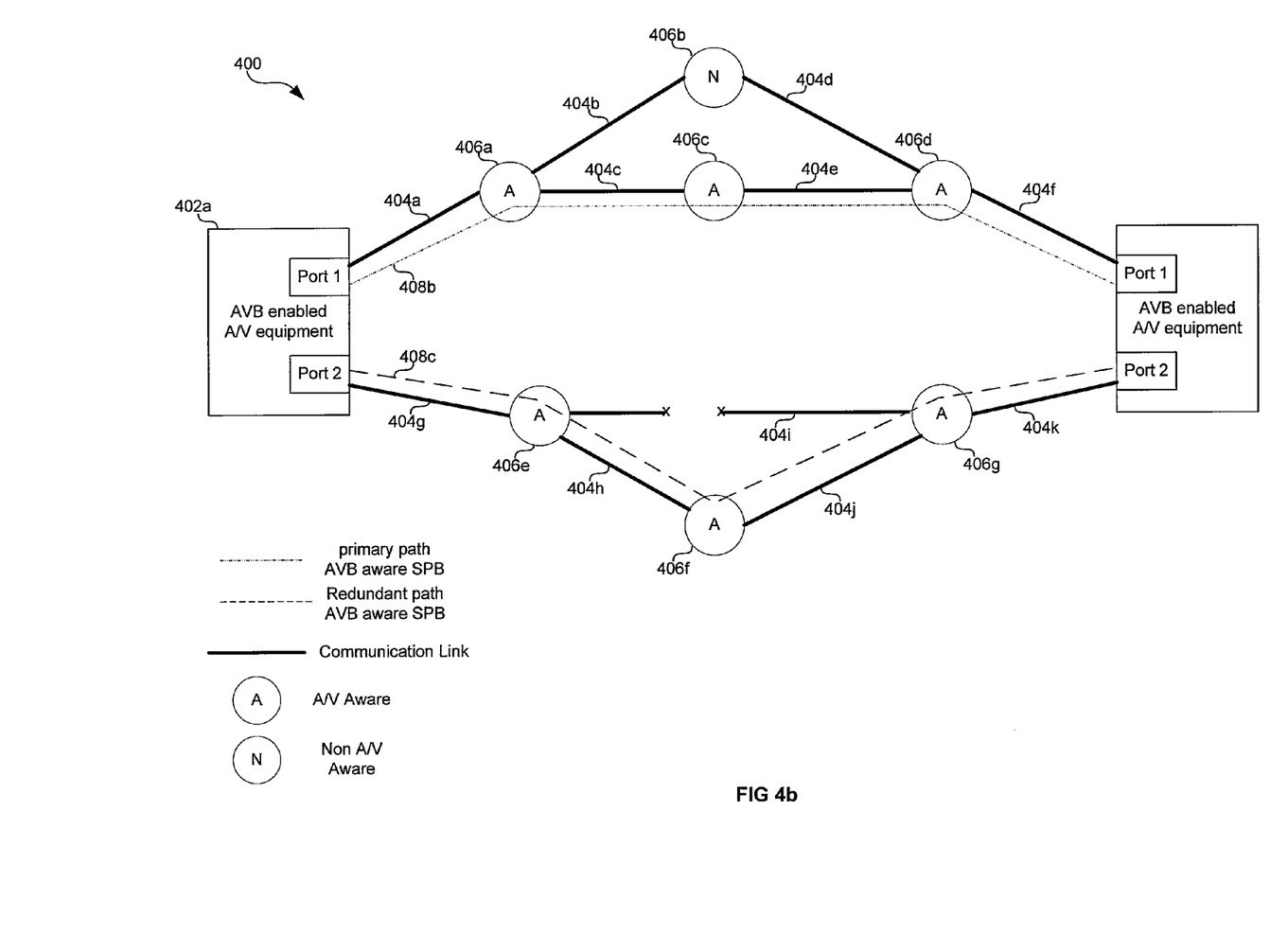
FIG. 4b is a diagram illustrating fault recovery in an AVB aware Shortest Path Bridging (SPB) network, in accordance with an embodiment of the invention.

FIG. 4b is a diagram illustrating fault recovery in an AVB aware Shortest Path Bridging (SPB) network, in accordance with an embodiment of the invention. Referring to FIG. 4b, there is shown a scenario where link 404i of the network has failed.

In operation, prior to failure of the link 404i, the node 402a may be transmitting a primary stream via the path 408a and a redundant stream via the path 408b. However, upon failure of the link 404i, the stream may no longer reach node 402b via the primary path 408a. Accordingly, aspects of the invention may enable the node 402b to recognize the failure in the primary path, and to utilize the data received via the redundant path 408b. In this manner, rendered/presented data at the node 402b may be unaffected by the failure of link 404i. However, a subsequent failure in the path 408b may result in a total loss of the stream, which depending on the situation of application, may have disastrous consequences. Therefore, aspects of the invention may enable the node 402a to detect a network failure. Upon detecting a failure of the path 408a, aspects of the invention may enable establishing a new redundant path, path 408c, such that further failures may be protected against. Accordingly, in addition to detecting least cost paths across a network, aspects of the invention may enable detecting alternate, higher cost, paths across a network and utilizing those paths in the event of a failure.

In this regard, when discovering a network topology, a plurality of possible paths across a network, and costs associated with those paths, may be stored in a memory such as the memory 208a. Hence, a network node may reference the stored network topology information when choosing a path over which to transmit data. In this manner, storing multiple path options in a memory may expedite the recovery process after a network failure since the nodes may not have to re-discover the network topology.

Aspects of a method and system for fault resilience in Audio/Video Bridging (AVB) aware Shortest Path Bridging (SPB) networks are provided. In this regard, a path cost, which may be based at least on AVB compatibility, may be determined for each network path, such as the paths 304 and 306 of FIG. 3, discovered between a first network node and a second network node. Additionally, a plurality of network paths may be selected based on the determined path cost, and a plurality of network connections may be established over the selected plurality of network paths. Also, a plurality of data streams may be transmitted and/or received via the established network connections, wherein at least one of data streams comprises data that is redundant to a first data stream. Furthermore, a primary data stream may be conveyed via a first network connection and one or more redundant data streams may be conveyed via a second network connection. A network connection that is to be utilized to convey a primary data stream may be selected based on said determined path cost. A routing table may be generated for the discovered network paths and may comprise the determined path costs and AVB compatibility. Upon failure of one or more of said chosen network paths, such as described with respect to FIG. 4b, an alternate network path may be selected from the routing table for establishing a new network connection. Aspects of the invention may enable assigning a first stream identifier to a first of a plurality of data streams, and assigning an additional unique stream identifier to each of the at least a second of the plurality of data streams that comprises data that is redundant to the first of said plurality of data streams, wherein each of said additional unique stream identifiers differs from said first stream identifier. The plurality of data streams may be buffered and/or processed based on sequencing information associated with the plurality of data streams, and/or based on determined path costs.

Another embodiment of the invention may provide a machine-readable storage, having stored thereon, a computer program having at least one code section executable by a machine, thereby causing the machine to perform the steps as described herein fault resilience in Audio/Video Bridging aware Shortest Path Bridging networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   determining a path cost for each of a plurality of network paths discovered between a first network node and a second network node, wherein said determined path cost for each one of said plurality of discovered network paths is based at least on whether said one of said plurality of discovered paths is enabled to implement Audio Video Bridging (AVB) protocols;
   selecting two or more of said plurality of discovered network paths based on said determined path costs;
   establishing a plurality of network connections between said first node and said second network node over said selected two or more of said plurality of discovered network paths; and
   concurrently transmitting and/or receiving a plurality of data streams via said established plurality of network connections, wherein at least a second of said plurality of data streams comprises data that is redundant to a first of said plurality of data streams.

2. The method according to claim 1, comprising conveying a primary data stream via a first of said plurality of network connections and conveying one or more corresponding redundant data streams via a at least a remaining portion of said plurality of network connections.

3. The method according to claim 1, comprising selecting one of said plurality of network connections that is to be utilized to convey a primary data stream based on said determined path costs.

4. The method according to claim 1, comprising generating a routing table for said plurality of discovered network paths, wherein said generated routing table comprises said determined path costs and indicates which of said plurality of discovered network paths is enabled to implement said AVB protocols.

5. The method according to claim 4, comprising, upon failure of one or more of said selected network paths, selecting from said table an alternate network path for establishing a new network connection.

6. The method according to claim 1, comprising:
   assigning a first stream identifier to said first of said plurality of data streams; and
   assigning an additional unique stream identifier to each of said at least a second of said plurality of data streams that comprises data that is redundant to said first of said plurality of data streams, wherein each of said additional unique stream identifier differs from said first stream identifier.

7. The method according to claim 1, comprising processing said plurality of data streams based on sequencing information associated with said plurality of data streams.

8. The method according to claim 1, comprising buffering and/or processing said plurality of data streams based on said determined path costs.

9. A machine-readable non-transitory medium having stored thereon, a computer program having at least one code section for networking, the at least one code section being executable by a machine for causing the machine to perform steps comprising:
   determining a path cost for each of a plurality of network paths discovered between a first network node and a second network node, wherein said determined path cost for each one of said plurality of discovered network paths is based at least on whether said one of said discovered paths is enabled to implement Audio Video Bridging (AVB) protocols;
   selecting two or more of said plurality of discovered network paths based on said determined path costs;
   establishing a plurality of network connections between said first node and said second network node over said selected two or more of said plurality of discovered network paths; and
   concurrently transmitting and/or receiving a plurality of data streams via said established plurality of network connections, wherein at least a second of said plurality of data streams comprises data that is redundant to a first of said plurality of data streams.

10. The machine-readable non-transitory medium according to claim 9, wherein said at least one code section comprises code for conveying a primary data stream via a first of said plurality of network connections and conveying one or more corresponding redundant data streams via a at least a remaining portion of said plurality of network connections.

11. The machine-readable non-transitory medium according to claim 9, wherein said at least one code section comprises code for selecting one of said plurality of network connections that is to be utilized to convey a primary data stream based on said determined path costs.

12. The machine-readable non-transitory medium according to claim 9, wherein said at least one code section comprises code for generating a routing table for said plurality of discovered network paths, wherein said generated routing table comprises said determined path costs and indicates which of said plurality of discovered network paths is enabled to implement said AVB protocols.

13. The machine-readable non-transitory medium according to claim 12, wherein said at least one code section comprises code for, upon failure of one or more of said selected network paths, selecting from said table an alternate network path for establishing a new network connection.

14. The machine-readable non-transitory medium according to claim 9, wherein said at least one code section comprises code for:
- assigning a first stream identifier to said first of said plurality of data streams; and
- assigning an additional unique stream identifier to each of said at least a second of said plurality of data streams that comprises data that is redundant to said first of said plurality of data streams, wherein each of said additional unique stream identifier differs from said first stream identifier.

15. The machine-readable non-transitory medium according to claim 9, wherein said at least one code section comprises code for processing said plurality of data streams based on sequencing information associated with said plurality of data streams.

16. The machine-readable non-transitory medium according to claim 9, comprising buffering and/or processing said plurality of data streams based on said determined path costs.

17. A system for networking, the system comprising:
One or more circuits that are enabled to:
- determine a path cost for each of a plurality of network paths discovered between a first network node and a second network node, wherein said determined path cost for each one of said discovered paths is based at least on whether said one of said plurality of discovered network paths is enabled to implement Audio Video Bridging (AVB) protocols;
- select two or more of said plurality of discovered network paths based on said determined path costs;
- establish a plurality of network connections between said first node and said second network node over said selected two or more of said plurality of discovered network paths; and
- concurrently transmit and/or receive a plurality of data streams via said established plurality of network connections, wherein at least a second of said plurality of data streams comprises data that is redundant to a first of said plurality of data streams.

18. The system according to claim 17, wherein said one or more circuits convey a primary data stream via a first of said plurality of network connections and convey one or more corresponding redundant data streams via a at least a remaining portion of said plurality of network connections.

19. The system according to claim 17, wherein said one or more circuits select one of said plurality of network connections that is to be utilized to convey a primary data stream based on said determined path costs.

20. The system according to claim 17, wherein said one or more circuits enable generation a routing table for said plurality of discovered network paths, wherein said generated routing table comprises said determined path costs and indicates which of said plurality of discovered network paths is enabled to implement said AVB protocols.

21. The system according to claim 20, wherein said one or more circuits select from said table an alternate network path for establishing a new network connection when one or more of said selected network paths fails.

22. The system according to claim 17, wherein said one or more circuits:
- assign a first stream identifier to said first of said plurality of data streams; and
- assign an additional unique stream identifier to each of said at least a second of said plurality of data streams that comprises data that is redundant to said first of said plurality of data streams, wherein each of said additional unique stream identifier differs from said first stream identifier.

23. The system according to claim 17, wherein said one or more circuits process said plurality of data streams based on sequencing information associated with said plurality of data streams.

24. The system according to claim 17, wherein said one or more circuits buffer and/or process said plurality of data streams based on said determined path costs.

* * * * *